(12) United States Patent
Jo

(10) Patent No.: US 6,563,838 B1
(45) Date of Patent: May 13, 2003

(54) NETWORK SWITCHING APPARATUS AND METHOD

(75) Inventor: Dal Ho Jo, Incheon (KR)

(73) Assignee: Fnet Co., Ltd, Seoul (KR)

( * ) Notice: Subject to any disclaimer, the term of this patent is extended or adjusted under 35 U.S.C. 154(b) by 0 days.

(21) Appl. No.: 09/473,762

(22) Filed: Dec. 29, 1999

(30) Foreign Application Priority Data

Dec. 31, 1998 (KR) .............................................. 98-63165

(51) Int. Cl.[7] .............................................. H04L 12/58
(52) U.S. Cl. ........................ 370/419; 710/10; 370/463; 709/250
(58) Field of Search ................................ 370/352, 353, 370/401, 411, 419, 463; 709/227, 228, 249, 329, 250; 710/10, 11, 18

(56) References Cited

U.S. PATENT DOCUMENTS

| | | | |
|---|---|---|---|
| 5,329,527 A | | 7/1994 | Ujihashi et al. |
| 5,659,685 A | * | 8/1997 | Williams et al. ............. 709/220 |
| 5,742,833 A | * | 4/1998 | Dea et al. .................... 713/323 |
| 5,910,954 A | | 6/1999 | Bronstein et al. ............ 870/401 |
| 6,216,187 B1 | * | 4/2001 | Truong ........................ 710/304 |
| 6,457,879 B1 | * | 10/2002 | Thurlow et al. ............. 710/104 |
| 6,473,810 B1 | * | 10/2002 | Patel et al. ..................... 710/7 |

OTHER PUBLICATIONS

Lalk An OC–12/STS–3C/ATM interface for gigabit network applications. Communications IEEE 1993, ICC 93, V. 2, p. 868–872.*

* cited by examiner

Primary Examiner—Hassan Kizou
Assistant Examiner—Dmitry Levitan
(74) Attorney, Agent, or Firm—Greenberg Traurig, P.C.

(57) ABSTRACT

A network switching apparatus and method which does not necessitate booting a computer system when switching networks by directly changing an Internet protocol (IP) address using a power saving mode provided in an operating system of the computer. The network switching apparatus includes a switching device for selecting at least one of the networks, and a control section for communicating with the network selected by the switching device, identifying a kind of the selected network, and performing a control operation using the power saving mode so that the selected network can be used without booting the computer system connected to the selected network when the network is switched.

7 Claims, 2 Drawing Sheets

NETWORK SWITCHING APPARATUS AND METHOD

BACKGROUND OF THE INVENTION

1. Field of the Invention

The present invention relates to an apparatus and method for switching networks. In particular, the present invention relates to a network switching apparatus and method which does not necessitate booting a computer by controlling a power saving mode when the networks are switched.

2. Description of the Related Art

Generally, in accordance with the development of the computers and communication techniques, information from all parts of the world can be easily obtained through Internet by connecting a computer provided with a communication device to networks.

A conventional network is classified into an internal network connected to a local area network (LAN), and an external network which is a public network connected to Internet. In case of need, a user can separately obtain required information from the internal network or from the external network by connecting the computer to either the internal network or the external network.

Also, in order to secure data maintained in the internal network while using the external network such as Internet for instance, in order to secure the data from hackers invading through the external network, a separate network may be provided wherein the internal network and the external network are not connected together.

In this case, the network switching device provided in the computer, i.e., the network switching device for connecting the internal network to the external network through cables, is connected to a LAN card of the computer, and the networks are selectively connected to the computer by a mechanical switching operation of the switching device, so that the user can obtain diverse information from the computer which is connected to the internal network or the external network.

However, the conventional computer network has the drawbacks in that the computer system should be rebooted for its environmental determination whenever the computer system is switched to a new network. Thus, the user should wait during the rebooting time of the computer system to use the switched network. Also, abrasion of contacts of the switching device may occur due to its frequent mechanical switching operation, and this causes the contact state of the switching device to be degraded, thereby deteriorating an on-line connection function of the switching device.

SUMMARY OF THE INVENTION

It is an object of the present invention to solve the problems involved in the related art, and to provide a network switching apparatus and method which performs an electronic network switching operation by directly changing an Internet protocol (IP) address according to the kind of the network using a power saving mode provided in the operating system, and thus does not necessitate booting a computer for its environmental determination even if the network is switched.

In one aspect of the present invention, there is provided a network switching apparatus for connecting a plurality of networks to a computer system, comprising:

a switching section for selecting at least one of the networks; and a control section for communicating with the network selected by the switching section, identifying a kind of the selected network, and performing a control operation using a power saving mode of the system so that the selected network can be used without booting the computer system connected to the selected network when it is identified that the network is switched and selected.

In another aspect of the present invention, there is provided a network switching method for performing a control operation so that a computer system is connected to and communicates with at least one of a plurality of networks, the method comprising the steps of:

identifying a kind of a connected network and communication type of the computer system connected to the network;

storing identified information in the computer system to consider the information when the network is switched;

applying the information on the switched network to an operating system of the computer system in accordance with a power saving mode of the computer system if the network is switched; and using the switched network without booting the computer system by the operating system to which the information on the switched network is applied.

BRIEF DESCRIPTION OF THE DRAWINGS

The above object, other features and advantages of the present invention will become more apparent by describing the preferred embodiment thereof with reference to the accompanying drawings, in which.

DETAILED DESCRIPTION OF THE PREFERRED EMBODIMENT

Now, the construction and operation of the present invention will be explained in detail with reference to the accompanying drawings.

Figure 1:
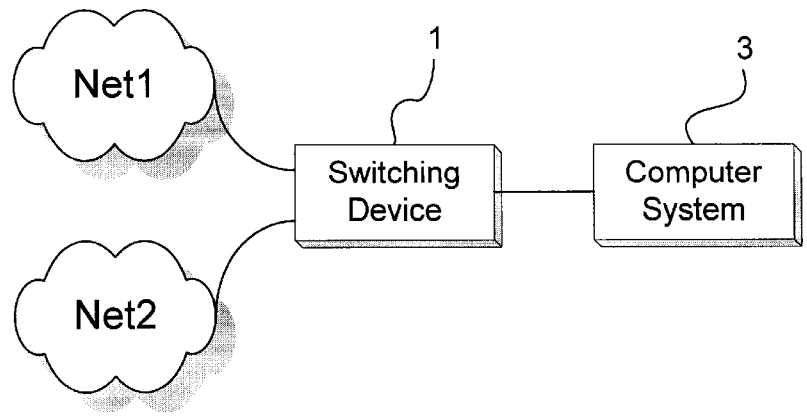
FIG. 1 is a block diagram illustrating the construction of the network switching apparatus according to the present invention.

FIG. 1 is a block diagram illustrating the construction of the network switching apparatus according to the present invention.

Referring to FIG. 1, the network switching apparatus according to the present invention includes a switching device and a control section.

The switching device 1 is connected to either one of different networks Net1 and Net2 which is connected to a computer system 3 under the control of a user or the control section.

The control section is implemented by a controller included in the computer system 3 or an integrated circuit (IC) which includes the controller, and exchanges information by the communication with the network Net1 or Net2 selected by the switching device 1.

Figure 2:
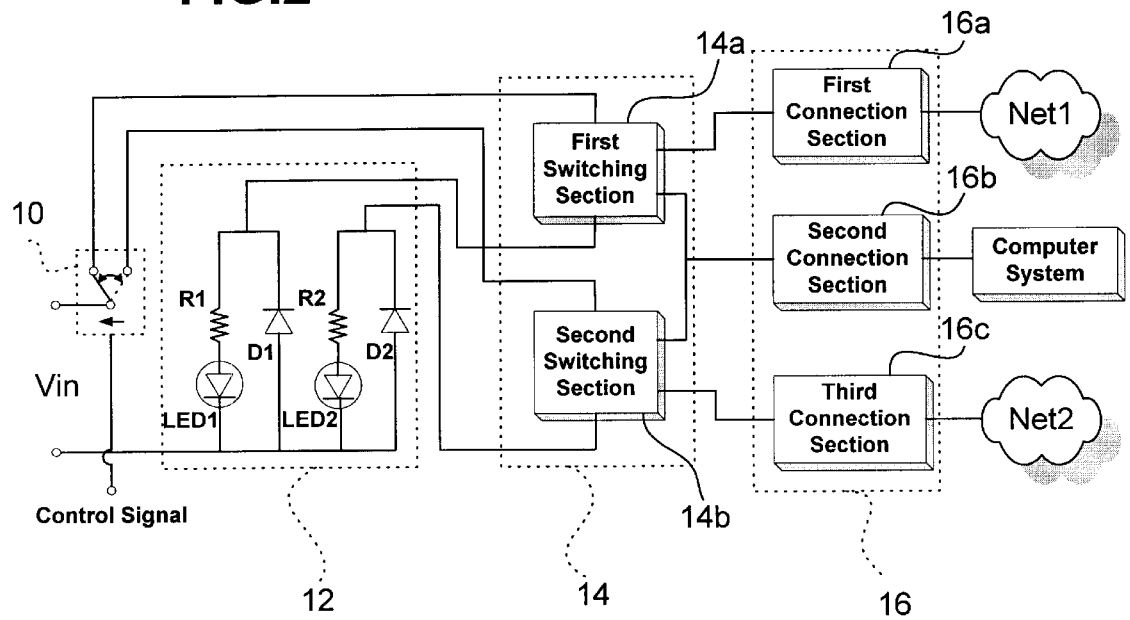
FIG. 2 is a schematic circuit diagram of the network switching apparatus of FIG. 1.

FIG. 2 is a schematic circuit diagram of the switching device of FIG. 1.

Referring to FIG. 2, the switching device 1 includes an operation section 10, display section 12, switching section 14, and connection section 16.

The operation section 10 receives at least one of a power supply and a control signal from the computer system 3, and is operated to select at least one of the networks.

In one embodiment of the present invention, the operation section 10 is implemented by a selection switch which is toggled by the manipulation of the user.

In another embodiment of the present invention, the operating section 10 is implemented by a network switch which is switch-controlled by a network switching control signal provided from the computer system 3. In this case, the network switching control signal is outputted from the computer system 3 to the network switch by a network switching program provided in the computer system and executed by clicking of a corresponding icon.

The display section 12 comprises light emitting diodes LED1 and LED2 for indicating to the user the network selected through the operation section 10. In the display section 12, diodes D1 and D2 are for preventing reverse current from flowing therethrough, and a power supply Vin supplied through resistors R1 and R2 is for driving the light emitting diodes LED1 and LED2.

The switching section 14 comprises a first switching section 14a and a second switching section 14b, each of which operates to form a closed circuit when the power supply Vin is applied thereto by the switching operation of the operation section 10. Preferably, the switching section 14 may be a circuit including relays.

The connection section 16 comprises connection ports through which the computer system 3 and the networks Net1 and Net2 are connected. The connection section 16 connects either of the networks Net1 and Net2 to the computer system 3 by the switching operation of the switching section 14. It is preferable that the connection section 16 is implemented by connection ports of RJ45 standard.

In the embodiment, the connection section 16 includes a first connection section 16a connected to the network Net1, a second connection section 16b connected to the computer system 3, and a third connection section 16c connected to the other network Net2.

Figure 3:
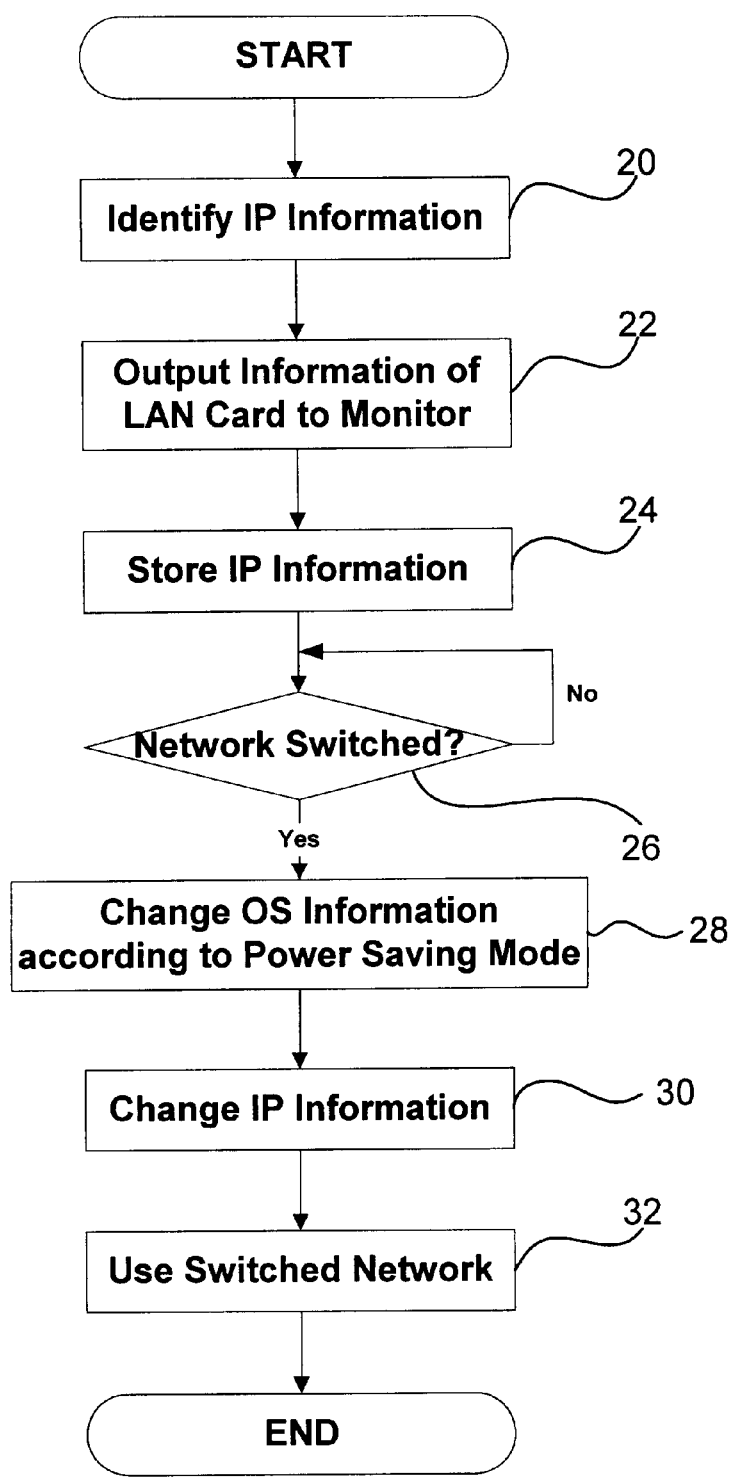
FIG. 3 is a flowchart illustrating the network switching method according to the present invention.

FIG. 3 is a flowchart illustrating the network switching method according to the present invention.

Referring to FIG. 3, when the computer system 3, which is connected to and communicates with one of the networks Net1 and Net2, is switched to the other network, the central processing unit (CPU) of the computer system 3 identifies the kind of the connected network and the communication type of the computer system 3 (steps 20 to 22).

If the communication type is identified as above, the computer system 3 compares the information of the existing network with the information of the operating system being used (step 20).

Then, the computer system 3 includes the currently used communication information, for instance, a hardware information such as the LAN card and a corresponding software information, to the information of the operating system, and simultaneously outputs the corresponding information to a monitor provided in the computer system 3 so that the user can recognize the information (step 22).

The information identified when the computer system is switched is stored in a predetermined storage by the operating system of the computer system 3, so that the information is considered during the next network switching operation (step 24).

If the network connection is changed, the information on the changed network is applied to the operating system of the computer system 3 according to the power saving mode which is an advance power management (APM) mode of the computer system 3 (steps 26 to 30).

Specifically, if the storage of the information is completed, the CPU of the computer system 3 judges if the network is switched (step 26). If it is judged that the network is switched, the computer system 3 then changes the information of the operating system according to the power saving mode (i.e., the APM mode) provided in the operating system of the computer system 3 (step 28).

The power saving mode (i.e., the ATM mode) is one of functions for controlling the determination of the computer structure and the basic hardware by a basic input output system (BIOS) software included in the operating system so that the manufacturer of the computer system 3 controls the hardware by the BIOS software. This function changes the IP address, and thus the rebooting of the hardware is not required.

Specifically, as the information of the operating system is changed according to the power saving mode, the IP address is simultaneously changed (step 30).

Then, the computer system 3 provided with the network switching device 1 is switched to another network without its booting operation by the software of the operating system whereby the information regarding the switched network is changed according to the power saving mode, and thus the user can use the switched network without waiting during the booting operation (step 32).

As described above, according to the present invention, since the network switching operation is performed by directly changing the IP address using the power saving mode provided in the operating system, the computer is not required to be rebooted, and thus the information processing during the network change can be rapidly performed.

Also, since the switching device is electronically controlled by either of the user or computer system, the present invention prevents inferior communications due to the degraded mechanical contact state of the switching device, and facilitates the network switching operation.

While the present invention has been described and illustrated herein with reference to the preferred embodiment thereof, it will be understood by those skilled in the art that various changes in form and details may be made therein without departing from the spirit and scope of the invention.

What is claimed is:

1. A network switching apparatus for connecting a plurality of networks to a computer system, comprising:
   a switching means for selecting at least one of the networks; and
   a control means for communicating with the network selected by the switching means, identifying a kind of the selected network, and performing a control operation using a power saving mode of the computer system so that the selected network can be used without booting the computer system connected to the selected network when the network is switched and selected.

2. The network switching apparatus as claimed in claim 1, wherein the switching means comprises:
   an operation section for receiving at least one of a power supply and a control signal from the computer system, and being operated to select at least one of the networks;
   a switching section for performing a switching operation according to a selection result of the operation section; and a connection section for electrically connecting one of the networks to the computer system according to the switching operation of the switching section.

3. The network switching apparatus as claimed in claim 2, wherein the operation section comprises a selection switch which is toggled by a user.

4. The network switching apparatus as claimed in claim 2, wherein the operating section comprises a network switch that is switch-controlled by a network switching control signal provided by a network switching program provided in the computer system and executed by an icon clicking of a user.

5. The network switching apparatus as claimed in claim 2, wherein the switching means further comprises a display section for displaying that the selected one of the networks is connected to the computer system.

6. A network switching method for performing a control operation so that a computer system is connected to and communicates with at least one of a plurality of networks, the method comprising the steps of:

identifying a kind of a connected network and communication type of the computer system connected to the network;

storing identified information in the computer system to consider the information when the network is switched;

applying the information on a switched network to an operating system of the computer system in accordance with a power saving mode of the computer system if the network is switched; and using the switched network without booting the computer system by the operating system to which the information on the switched network is applied.

7. The network switching method as claimed in claim 6, wherein a network switching means is provided, and is manually or automatically controlled to switch the networks by a user or the computer system.

* * * * *